May 7, 1935. O. H. FRANKLIN 2,000,749
NUT CRACKING MACHINE
Filed March 27, 1933 2 Sheets-Sheet 2
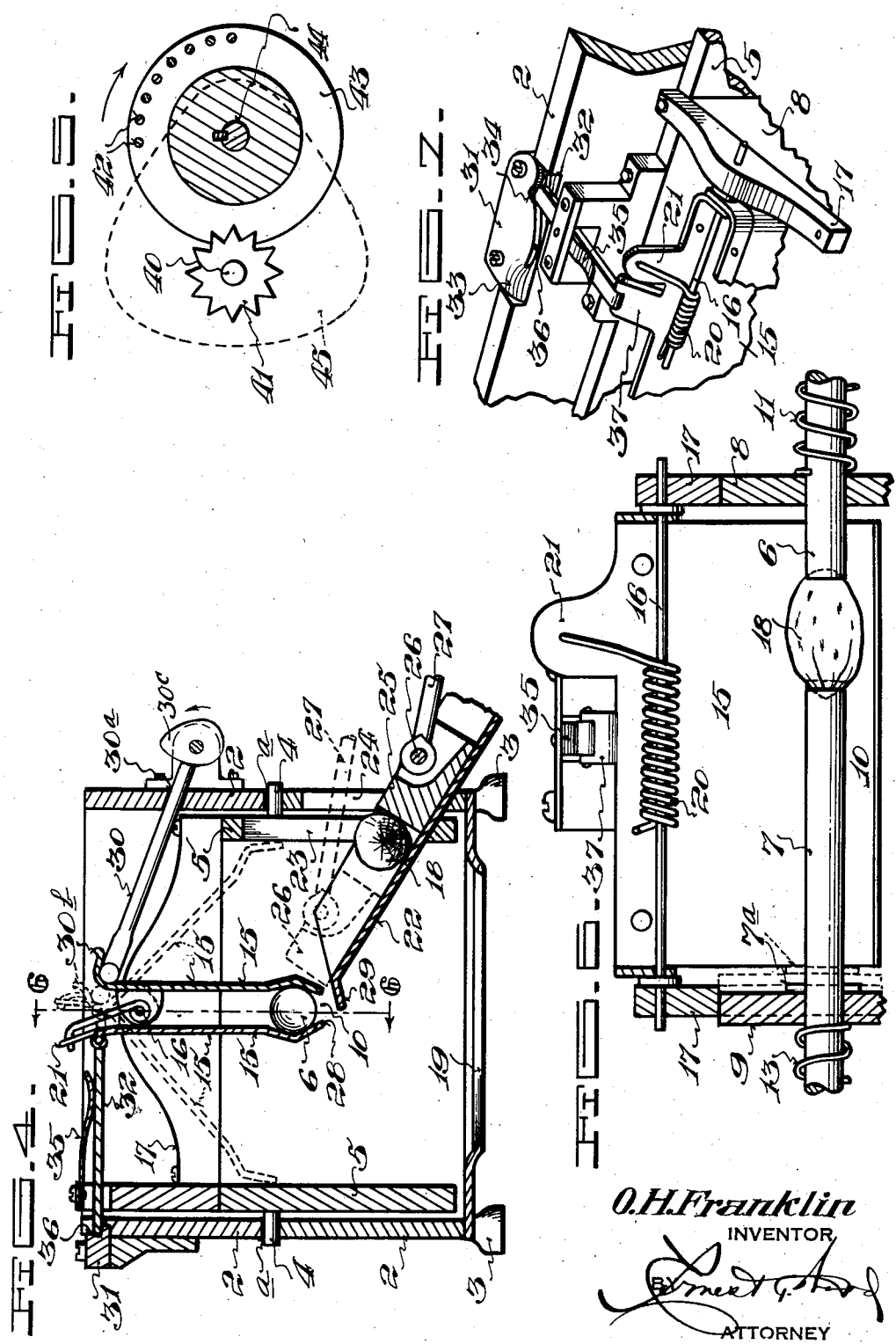

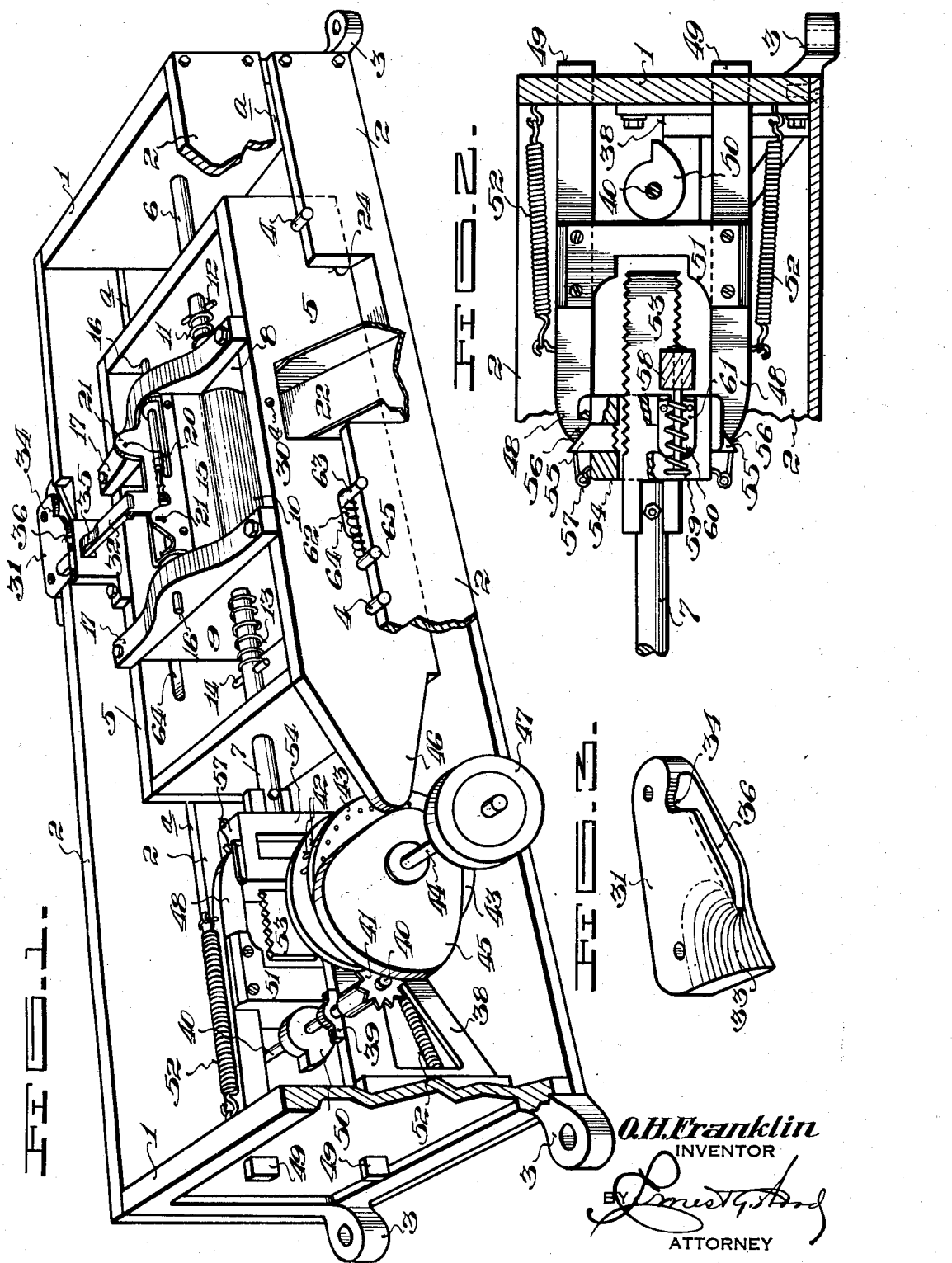

Patented May 7, 1935

2,000,749

UNITED STATES PATENT OFFICE 2,000,749

NUT CRACKING MACHINE

Oliver H. Franklin, Tyler, Tex., assignor of one-half to T. A. Hudson and Emma E. Hudson, Tyler, Tex.

Application March 27, 1933, Serial No. 662,863

5 Claims. (Cl. 146—12)

This invention relates to machines for cracking nuts preparatory to the removal of the shell and it has particular reference to a machine of the character adapted for commercial use in preparing nuts in quantities for various uses.

The principal object of the invention is to provide a nut cracking machine which, while especially designed for breaking the shell on pecans or nuts of a similar shape, may also be used for cracking other kinds of nuts. The element of prime importance in the machine is the means by which the pressure elements adjust themselves automatically to the nut and exert the same pressure on each nut irrespective of its size or length, therefore it is impossible for a nut of any size to escape the action of these elements and all are subjected to the same degree of cracking pressure.

Another object of the invention is to provide a novel and simple carriage, in which is mounted the cracking chamber and designed to reciprocate in timed relation to a novel feeding mechanism, which latter is designed to convey nuts into the cracking chamber to be subjected to the action of the pressure elements.

Still another object of the invention is to provide means for moving the carriage in the process of cracking a nut, combined with means for momentarily locking one of the pressure elements or plungers for bringing about the actual cracking operation, the latter means being operated in timed relation to the carriage operating means and releasable when sufficient pressure is brought to bear upon the nut to crack the shell thereof.

Broadly, the invention comprehends the provision of a nut cracking machine designed for commercial use and having but few moving parts, all of which are accessible for replacement or repair, due to the fact that these parts as well as the frame of the machine are designed to be readily and quickly dismounted and equally as quickly assembled.

With the foregoing objects as paramount, the invention has particular reference to its salient features of construction and arrangement of parts, which will become manifest as the description proceeds, taken in connection with the accompanying drawings, wherein:—

Figure 1 is a perspective view of a machine embodying the invention, with portions broken away.

Figure 2 is a detail view of the plunger drive and locking mechanism.

Figure 3 is a detail view of one of the tripping cams, whose function is to open the cracking chamber to release a cracked nut.

Figure 4 is an end elevation in section taken transversely through the middle of the cracking chamber.

Figure 5 is a detail view of the carriage operating means and its relation to the plunger driving means.

Figure 6 is a detail view of the cracking chamber on line 6—6 of Figure 4, and

Figure 7 is a fragmentary view further showing the mechanism by which the cracking chamber is opened to discharge a cracked nut.

Continuing with a more detailed explanation of the drawings, reference is primarily made to Figure 1 which shows the housing, which, in the present case, is comprised of the end castings 1 having parallel side sections 2 affixed thereto and so spaced as to define a slot $a$ therebetween, the purpose of which will be later set forth. The end sections are cast to include apertured base members 3 to enable the machine to be securely fastened to a table or other support.

Suspended by means of pins or rollers 4 for reciprocating movement in the housing, is a carriage 5, the pins 4 reposing in the said slots $a$ and sliding unrestrictedly therein. The end walls of the carriage 5 are apertured to receive a stationary plunger 6 and a reciprocating plunger 7. A pair of spacing blocks 8 and 9 are disposed transversely within the carriage 5 and spaced apart to define an intermediate area to accommodate the crushing chamber 10. Reference to this chamber will be made in detail presently.

Surrounding the stationary plunger or pressure element 6, within the confines of the carriage 5 is a compression spring 11. This is shown in Figure 1. One end of the spring 11 normally rests against the spacer block 8 and the other end rests against a lateral pin 12 or other suitable device affixed to the plunger 6. Thus, as the carriage 5 is moved rearwardly, the spring 11 resists such movement and returns the carriage to normal position.

A similar spring 13 is interposed between the wall of the companion spacer block 9 and a lateral pin or similar stop 14, carried by the moving plunger 7 to return the plunger to normal position after a cracking operation. The moving force or actuating mechanism for this plunger will be described presently.

Referring now particularly to the crushing chamber and its associated elements, attention is directed to Figures 4, 6 and 7. It will be noted that the chamber 10 is constructed primarily of two independently movable plates 15. These plates both pivot on the shaft 16, whose ends are journaled in the transverse members 17, superimposed upon the spacer blocks 8 and 9 and the lower ends of the plates rest against the projecting ends of the plungers 6 and 7. It is intended that one of the plates 15 move outwardly to receive the nut 18 while the carriage 5 is motionless at one extreme position and that the companion plate 15 shall move outwardly in the opposite direction, as shown by dotted lines in Figure 4 subsequent to the cracking operation and during return movement of the carriage 5, to deposit the cracked nut through the opening 19 in the base of the machine and into a suitable receptacle therebelow, not shown. The plates 15 are held normally in clamped position on the nut by means of a torsion spring 20, surrounding the shaft 16 and whose ends are secured in the upwardly extending projections 21 on each of the plates 15.

It will be observed that the lower ends of the plates are bent longitudinally to define an elongated chamber which is indicated by the reference character 10, generally indicating the cracking chamber. A chute 22 enters an aperture 23 in the wall of the carriage 5 and terminates below the chamber 10.

Since the chute 22 must be stationary with respect to the carriage 5, provisions in the form of a recess 24 must be made in one of the side plates 2 of the machine housing to allow this chute to move to and fro as the carriage 5 is reciprocated.

The chute 22 is inclined to enable the nuts 18 to be elevated and deposited into the cracking chamber 10, rather than allowing them to fall therein by gravity since in rolling them, they may be more uniformly fed into the chamber, it being understood that in the case of pecans, it is preferred and even necessary that they be cracked by bringing pressure to bear on their ends in order that the meat will not be damaged in cracking the shell.

It will be understood that the objects and claims of the present invention are directed to the actual elements shown and that the feeding mechanism per se, may be of any suitable design, if properly timed to function in accordance with the movements of the carriage 5, as described.

Accordingly, a follower block 25 is disposed for sliding movement in the chute 22 and has pivoted thereto at 26 a link 27. It is apparent that by advancing the link 27 by means of a cam, eccentric or the like, the block 25 will be moved up the inclined chute 22 to the dotted position shown in Figure 4, thereby rolling the nut 18 into the trough defined by the lower edge 28 of the plate 15 and the curved lip 29 of the chute 22. It will be understood that the companion plate 15 is raised to the dotted position shown at the right in Figure 4 to admit the nut.

Raising of the plate 15 of the chamber 10 is accomplished by means of a push rod 30, passing through an aperture 30a in one wall of the housing. It will be remembered that the carriage 5 reciprocates while the rod 30 is limited to endwise movement. Hence, the upper end of the plate 15 is curved at 30b to receive the end of the rod 30 when the carriage returns to charging position. At this moment the rod 30 is urged inwardly by means of a cam 30c, to exert pressure upon the upper end of the plate 15 above its pivot point, thus to elevate the same to the position shown in Figure 4 which is the receiving position.

The mechanism employed for opening the chamber 10 preparatory to discharging a nut subsequent to the cracking operation is shown in the initial position in Figure 1 and in a position preparatory to actuating the plate 15, in Figure 7. A cam 31 is affixed on one of the side walls 2 of the machine housing and is adapted to effect endwise movement of a bar 32. This cam 31 is shown in detail in Figure 3. In this figure it will be noted that the cam has a slope 33 on which the free end of the bar 32 normally rests and as the carriage 5 is advanced against the resistance of the compression spring 11, the arm 32 rides upon the body of the cam until the recess 34 is reached and by the impelling force of the leaf spring 35, the arm 32 is dropped into alignment with the groove 36 in the side of the cam 31 and as the carriage 5 is returned to normal position by the action of the spring 11, the arm follows the contour of the groove 36, causing the arm 32 to move inwardly, thus pushing against the upwardly projecting portion 37 of the plate 15, to which the inner end of the bar 32 is connected.

Since the point of engagement between the bar and the plate is above the pivotal point of the plate, the plate 15 is moved outwardly and is timed to do so as the carriage is returned to the normal position. The torsion spring 20, as stated previously, resists the pivoting movement of the plates 15.

Referring now particularly to the carriage operating mechanism and the mechanism for operating the plunger 7, attention is directed to Figures 1, 2 and 5. In Figures 1 and 2 is shown a bearing support 38 supporting a bearing 39 in which is journaled a shaft 40. A gear 41 is carried upon the end of the shaft 40 and is intermittently engaged by a row of pins 42 or gear teeth carried by a segmental gear or the like 43 keyed to a shaft 44. The shaft 44 is a stub shaft and although not shown in the figures, it is journaled in bearings mounted upon the support 38 and upon the upper edge of the lower side plate 2, which has been cut away in Figure 1 for the sake of clarity. The shaft 44 also carries a lobe cam 45 against whose periphery a projected portion 46 of the carriage 5 abuts. The cam 45 performs actual work on about one-fourth of its periphery which allows for momentary hesitation of the carriage at each extreme limit of its travel for the purpose of insuring ample time for the adjustment of the plunger 7 to the nut preparatory to the cracking operation and to permit the follower block 25 to inject a nut at the opposite position of the carriage. A wheel or gear 47 is carried by the outer end of the shaft 44, to accommodate a drive belt, chain or the like.

Mounted for sliding movement in one end of the housing is a yoke 48, having guide arms 49 slidingly extended through openings in one of the end castings 1. A cam 50 carried by the shaft 40 is in continuous engagement with a vertical cross member 51 affixed to and forming a part of the yoke 48. A pair of springs 52 normally hold the yoke in retracted position and the cross member 51 in engagement with the cam 50.

The moving plunger 7 has affixed to its free end a substantially flat, serrated bar 53, which extends through a substantially rectangular collar 54. As apparent in Figure 2, the collar 54 has openings in its top and bottom which communicate with the rectangular opening therethrough and reposing in these openings are dogs 55. It will be observed that the exposed ends 56 of these dogs are obliquely cut or deflected angularly while the inner ends are serrated to correspond with the serrated edges of the bar 53. Springs 57 hold the dogs 55 in extended position to be depressed by the arms of the yoke 48, which are likewise deflected to conform with the ends of the dog 55.

Disposed at one side of the rectangular collar 54 and connected to the wall of the machine housing is a block 58, shown only in Figure 2 and a pin 59 is mounted in this block and extends parallel to and along the side of the serrated bar 53. A compression spring 60 is interposed between the head of the pin 59 and an upturned bracket 61 carried by the said rectangular collar 54. As will become apparent presently, in the actual nut cracking operation, the collar 54 is slightly advanced in the act of locking the plunger 7 and the spring 60 is provided to return the collar to normal position at the completion of the cycle.

In operation, clockwise rotation of the lobe cam 45 will urge the carriage 5 forward against the resistance of the compression spring 11, mounted upon the stationary plunger or mandrel 6. First however, it will be remembered that only about one-fourth of the periphery of the cam 45 is operative in advancing the carriage and allows a period of rest for the carriage 5, during which the rod or link 27 is moved inwardly to actuate the follower block 25 to move a nut into cracking position as explained previously. Thereupon, the lobe of the cam 45 is timed to come into operative engagement with the extended portion 46 of the carriage 5 to advance the same. The nut is now clamped between the plates 15 in cracking position.

When the lobe cam 45 is rotated a predetermined extent, the pins or teeth 42 in the segmental gear 43 come into engagement with the teeth of the gear 41; thereby rotating the cam 50 against the cross member 51 of the yoke 48. The yoke therefore begins to advance and its arms engage the deflected ends of the dogs 55, urging them inwardly into engagement with the serrated edges of the bar 53, against the resistance of the springs 57, thus the yoke 48 is locked with respect to the cracking plunger 7, which it will be understood, has advanced with the carriage 5 independently of the yoke 48 and the cam 50, which is the element that furnishes the actual pressure for cracking the nut.

After the carriage has been moved to its fullest extent, the shape of the lobe cam 45 allows for a momentary hesitation while the cam 50 continues to advance the yoke 48, which is now locked with and drives the plunger 7 slightly forward, bringing just enough pressure against the nut to crack the shell. When the nut is cracked by the pressure exerted upon the plunger 7 by the cam 50, through the yoke 48, the carriage 5 is permitted to return suddenly by the action of the compression spring 11 and is released for such sudden movement by reason of the fact that the pins 42 of the lantern gear 43 have completed the cycle, leaving the carriage under the influence of the spring 11 alone.

In the return cycle, the cracked nut is released from the chamber 10 by reason of the engagement of the arm 32 with the stationary cam 34 in the manner previously explained.

It has been previously stated that the cracking plunger 7 moves with the carriage 5 as it is advanced by the lobe cam 45. Not only is this true but the plunger 7 is capable of free endwise movement in the carriage 5, restricted only by the pressure of a nut in the chamber 10. The compression spring 13, combined with the small spring 62 on the side of the machine shown in Figure 1 is effective in bringing about adjustment of the plunger to the size or length of the nut to be cracked. This is a very important feature of the machine and, as pointed out in Figure 6, the space block 9 is movable relative to the walls of the carriage 5, both the spring 13 and the springs 62 serving to hold the space block 9 in normal position.

Pins 63 extend outwardly from the space block 9 through slots 64 in the walls of the carriage 5 and a stationary pin 65 extends outwardly from the wall of the carriage 5 and the springs 62 are interposed between these two pins so that the space block 9 may be moved as explained.

With the foregoing provision, the plunger 7 is capable of unrestricted, flexible movement until it comes into contact with the nut. When this occurs, and should the nut be of unusual length, the carriage, in completing its advancing cycle, continues to move, although the plunger 7 is interrupted in its movement by the presence of the nut. The space block 9 is likewise held stationary with respect to the plunger 7 by means of a pin 7a and resists the action of spring 13, as does the plunger 7 until the carriage 5 has completed its advancing cycle. At this point, the plunger is locked preparatory to exerting pressure on the nut.

The plunger 7, which is now in cracking position is locked by the advancing movement of the yoke 48 against the dogs 55, which are caused to enter the serrations in the bar 53 at any position they happen to fall depending upon and governed solely by the length of the nut interposed between the end of the mandrel 6 and plunger 7. When so locked the cam 50 has rotated to a position to engage the yoke 48 and advances the same to propel the plunger 7 forwardly against the nut to crack its shell.

The foregoing adjustments occur during the period of rest afforded the carriage at its extreme advanced position by the peculiar shape of the cam 45 and after the cracking operation is completed, the carriage is permitted to return to its original position, during which the chamber 10 is opened to release the cracked nut preparatory to receiving another nut at the next rest period of the carriage, as explained.

Manifestly, the construction shown is capable of considerable modification and such modification as is considered within the scope and meaning of the appended claims is also considered within the spirit and intent of the inventon.

What is claimed is:

1. A nut cracking machine including a reciprocating nut receiving means and a stationary mandrel, said nut receiving means comprising plates having their lower extremities outwardly channeled to jointly define an open ended chamber when in operative position, said plates being hinged opposite said chamber for relative movement, an independently advanceable pressure plunger arranged to yieldingly enter the ends of said chamber to engage a nut therein during movement of the latter in one direction, means for locking said plunger for positive movement against said nut and means for applying pressure against said plunger to crack the shell of said nut.

2. A nut cracking machine including a reciprocating carriage, nut receiving means mounted in said carriage and comprising a pair of plates hinged for relative displacement and having channeled lower extremities jointly defining an open ended chamber when in operative relationship, a stationary mandrel entering said chamber, a plunger advanceable with said carriage into yielding engagement with the nut in said chamber whereby to interpose said nut in cracking position between the ends of said mandrel and plunger, means to displace one of said plates whereby to effect insertion of a nut to be embraced by said chamber when said plates are closed, means for closing said plates, means for locking said plunger and means for further advancing said plunger positively to break the shell of said nut and means to displace the companion plate to release said nut.

3. A nut cracking machine including a carriage, a pair of plates pivotally mounted in said carriage for relative movement and having their lower ends shaped to jointly define a cracking chamber for receiving a nut preparatory to cracking the shell thereof means to raise one of said plates to receive a nut, a stationary mandrel and a yielding pressure plunger whose ends are in alinement to interpose said nut, means for freely advancing said plunger, means for locking said plunger, means for positively moving said plunger to break the shell of said nut, and means to raise the companion plate to release said nut.

4. A nut cracking machine including a carriage and a pair of plates pivoted for independent outward movement toward the sides of said carriage and having means jointly in their lower extremities to retain a nut when in closed relationship, a fixed mandrel and a normally yielding plunger movable into alinement with the end of said mandrel to interpose said nut, means for moving one of said plates to receive said nut for subjection to the action of said plunger in alining said nut preparatory to cracking, means for engaging and positively advancing said plunger against said nut to crack the shell thereof and means for moving the companion plate to release said nut.

5. A machine for cracking and shelling nuts including a carriage, a nut receiving chamber comprising plates pivoted at their upper extremities whereby their lower extremities will be capable of outward movement, means to raise one of said plates to receive a nut therebetween when said carriage is moved in one direction, a normally yielding plunger mounted in said carriage and advanceable on said nut, a mandrel against which said nut is urged by said plunger for holding the same for subjection to the action of said plunger, means for locking said plunger, means for further advancing said plunger to crack the shell of said nut and means to raise the companion plate of said chamber to release said nut when said carriage is returned to normal position.

OLIVER H. FRANKLIN.